UNITED STATES PATENT OFFICE.

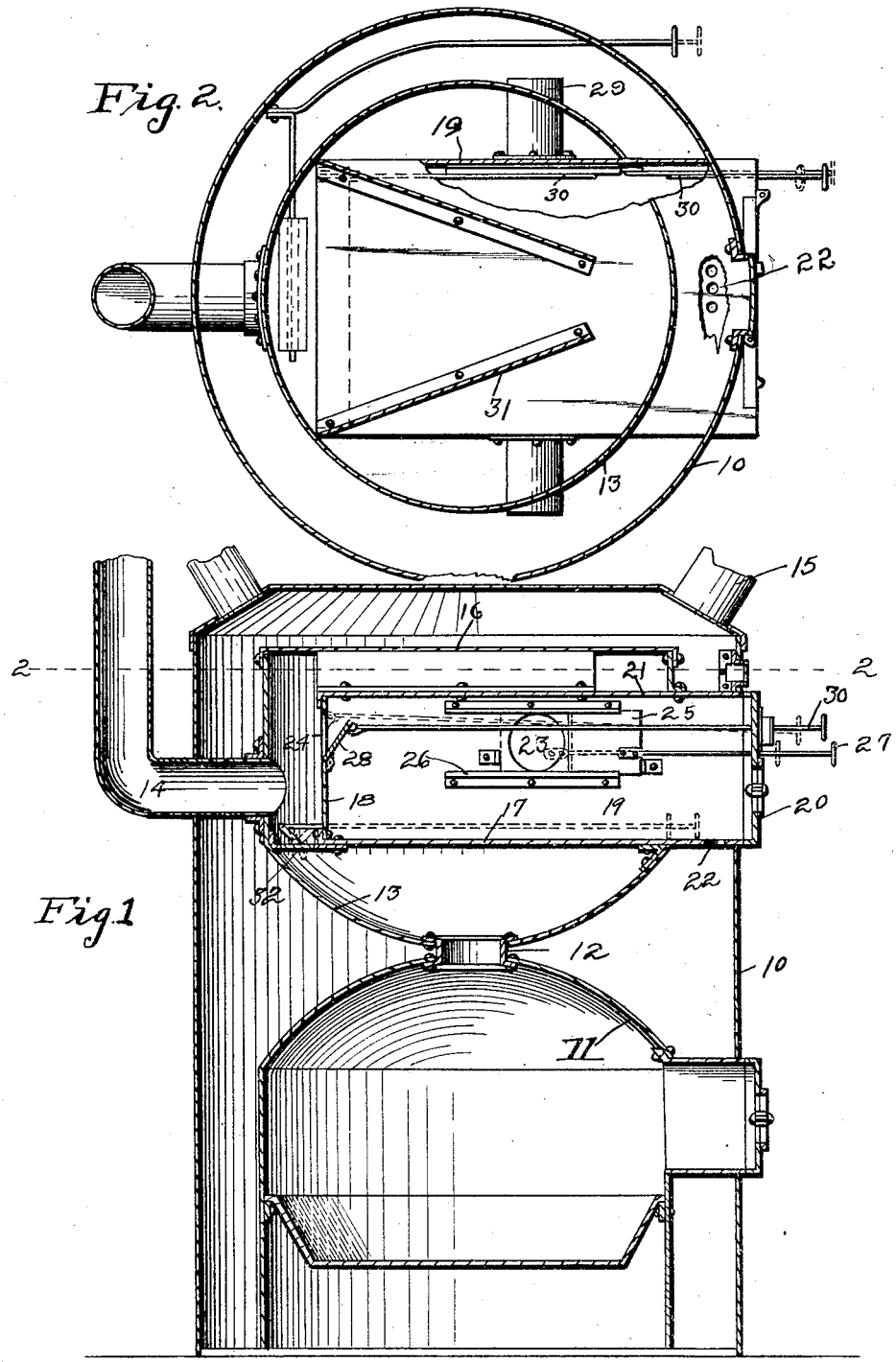

FRANK T. BOOTH, OF DES MOINES, IOWA.

OVEN FOR FURNACES.

932,953.

Specification of Letters Patent. Patented Aug. 31, 1909.

Application filed March 6, 1909. Serial No. 481,744.

*To all whom it may concern:*

Be it known that I, FRANK T. BOOTH, a citizen of the United States, residing at Des Moines, in the county of Polk and State of Iowa, have invented a certain new and useful Oven for Furnaces, of which the following is a specification.

The object of my invention is to provide a device to be used in the nature of an attachment to be applied to hot air furnaces to serve the double function of providing an oven in which cooking may be done and at the same time to provide additional radiating surface to thereby supply increased heat to the air contained in the jacket surrounding the furnace.

A further object is to provide a device of this kind of simple, durable and inexpensive construction, in which the heated air contained within the furnace jacket may be delivered into the oven for heating the oven or may be made to pass through the oven and be heated by contact with the oven walls, and then discharged into the space between the jacket and the furnace for supplying heat to the furnace pipes.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a vertical central sectional view of a complete furnace embodying my invention, and Fig. 2 shows a horizontal sectional view on the line 2—2 of Fig. 1.

Referring to the accompanying drawings, I have used the reference numeral 10 to indicate the outside jacket of the furnace.

11 indicates a furnace combustion chamber having a discharge opening 12 at its top. Connected with the discharge opening 12 is a heating chamber 13, the body portion of which is cylindrical, as shown in Fig. 2, and the lower portion is of inverted dome shape and connected at its central portion with the combustion chamber so that the products of combustion will rise through the opening 12 and enter the interior of the heating chamber 13. In the rear of the heating chamber 13 is a flue 14 extended outwardly through the casing 10. In the top of the casing 10 are the hot air pipes 15. The heating chamber 13 is also provided with a solid closed top 16 so that all of the products of combustion entering it are forced to pass out through the flue and can not enter between the heating chamber 13 and the casing 10.

Arranged within the heating chamber 13 is an oven comprising a bottom 17, a rear end 18, sides 19, a front 20, and a top 21. The front of the oven extends through the front of the casing 10 and the rear of the oven stands spaced apart from the rear of the heating chamber 13. In the bottom 17 of the oven is an opening 22 through which the heat arising from the combustion chamber and contained between it and the casing 10 may enter the oven. In each of the oven sides is an opening 23, and a pipe 29 is extended from said opening outwardly through the side of the heating chamber 13 so that the heat within the oven may pass out through said opening and pipe into the hot air space within the casing 10. A sliding damper 25 is provided for each of said openings 23 and is mounted in the tracks 26, and each damper is provided with a handle 27 extended through the front of the oven to provide means for operating the damper. In the rear wall 18 of the oven is a hinged damper 28 to cover the opening 24 which leads to the space between the rear of the oven and the rear of the heating chamber 13. This damper is controlled by means of a rod 30 which is extended through the front of the oven.

In order to cause the products of combustion arising from the combustion chamber to pass all around the sides and top of the oven, I provide on top of the oven and between it and the top 16 of the heating chamber, two deflector plates 31 extended from the rear top portion of the oven forwardly and toward each other to a point slightly spaced apart from the front of the heating chamber 13. These deflectors extend upwardly as far as the top of the heating chamber so that all the products of combustion arising from the combustion chamber will first strike upon the bottom of the oven and will then pass laterally to the spaces between the sides of the oven and the sides of the heating chamber and they will then pass upwardly along the sides of the oven and over the top of the oven. The deflector plates 31 will then cause them to move forwardly to the front of the heating chamber and then they will pass rearwardly between the deflector plates 31 and downwardly at the rear of the oven to the flue 14. The plate 32 is provided to cover the space between the bottom of the oven and the rear of the heating chamber.

In practical use and assuming that the device is being used for heating air only, I then close the damper 28 and open the dampers 25. This will cause the heated air arising from the combustion chamber to pass upwardly through the opening 22 and then through the oven to the pipes 29. If, however, it is desired to use the device as an oven, then the dampers 25 are closed and the damper 28 may be opened as far as found necessary for purposes of ventilating the oven and permitting the odors arising from the oven to pass to the flue.

By means of the device described, it is obvious that the attachment will aid in heating air within the furnace casing which heated air will be supplied to the hot air pipes and, hence, the device will be advantageous even when it is not being used as an oven. Then, when it is desired to use the device as an oven, the dampers 25 may be closed so that none of the odors arising from the oven can enter the hot air pipes, but will pass off through the opening 24 in the rear of the oven and the flue.

I claim as my invention.

1. A device of the class described, comprising a furnace casing, a combustion chamber within the casing spaced apart from it, a heating chamber above the combustion chamber and in communication with it, said heating chamber being closed on all sides and its top, and being spaced apart from the casing, a flue communicating with the heating chamber, an oven within said heating chamber, a pipe leading from the side of the oven through the heating chamber into the space between the casing and the heating chamber, and a damper to cover said pipe, said oven also having an opening in its bottom communicating with the space between the casing and the combustion chamber.

2. An improved furnace, comprising a casing, a combustion chamber within the casing and spaced apart from it, a heating chamber in the upper portion of the furnace spaced apart from the casing and inclosed on all sides and communicating with the combustion chamber, a flue communicating with the heating chamber, an oven mounted within the heating chamber and extended through the front of the casing, the sides of the oven being spaced apart from the sides of the heating chamber, means for closing the space between the rear of the oven and the adjacent portion of the heating chamber at the bottom of the oven, said oven being provided with an opening in its bottom to communicate with the space between the casing and the combustion chamber, pipes at the sides of the oven leading from the oven to the space between the heating chamber and the casing, dampers to cover said pipes, said oven being also provided with an opening at its rear, a damper to cover said opening and two deflector plates arranged between the top of the oven and the top of the heating chamber and extended from the rear corners of the oven forwardly and toward each other to a point spaced apart from the front side of the heating chamber, arranged and combined substantially in the manner set forth and for the purposes stated.

Des Moines, Iowa, Feb. 18, 1909.

FRANK T. BOOTH.

Witnesses:
RALPH ORWIG,
MILDRED B. GOLDIZEN.